United States Patent [19]

Arrington

[11] Patent Number: 5,686,036
[45] Date of Patent: Nov. 11, 1997

[54] PROCESS FOR MAKING A CELLULOSE TRIACETATE PHOTOGRAPHIC FILM BASE

[75] Inventor: Eric Eugene Arrington, Farmington, N.Y.

[73] Assignee: Eastman Kodak Company, Rochester, N.Y.

[21] Appl. No.: 585,327

[22] Filed: Jan. 11, 1996

[51] Int. Cl.$^6$ .................................. B29C 41/26
[52] U.S. Cl. ............... 264/207; 264/211.11; 264/212; 264/217
[58] Field of Search .................. 264/211.11, 212, 264/216, 207, 217

[56] References Cited

U.S. PATENT DOCUMENTS

| | | | |
|---|---|---|---|
| 2,319,052 | 5/1943 | Fordyce et al. | 264/217 |
| 2,492,977 | 1/1950 | Fordyce et al. | 264/217 |
| 2,921,345 | 1/1960 | Bennes | 264/218 |
| 3,038,209 | 6/1962 | Hunter, Jr. et al. | 264/212 |
| 3,738,924 | 6/1973 | Dotson et al. | 264/217 |
| 5,188,788 | 2/1993 | Suzuki et al. | 264/207 |
| 5,529,737 | 6/1996 | Arrington et al. | 264/207 |
| 5,580,911 | 12/1996 | Buchanan et al. | 524/41 |

FOREIGN PATENT DOCUMENTS

| | | | |
|---|---|---|---|
| 61-100421 | 5/1986 | Japan | 264/217 |
| 61-158414 | 7/1986 | Japan | 264/212 |
| 62-64514 | 3/1987 | Japan | 264/212 |
| 2-111511 | 4/1990 | Japan | 264/212 |

*Primary Examiner*—Jeffery R. Thurlow
*Attorney, Agent, or Firm*—Carl F. Ruoff; Robert A. Gerlach

[57] ABSTRACT

The invention provides a method of making a cellulose triacetate photographic film base which comprises providing a casting composition of cellulose triacetate, plasticizer, and solvent having a cellulose triacetate and plasticizer concentration of from 36% to 72% by weight, casting the coating composition at a temperature of from 40° C. to 63° C. unto a surface maintained at from −70° C. to 21° C. for a residence time from 3 to 8 seconds, in accordance with the equation $Tr/Tg<1.9$, where $Tg$ and $Tr$ are the glass transition temperature in degrees Kelvin and the temperature of the casting composition in degrees Kelvin at a point adjacent to the surface where the film base is separated from the surface.

11 Claims, No Drawings

PROCESS FOR MAKING A CELLULOSE TRIACETATE PHOTOGRAPHIC FILM BASE

BACKGROUND OF THE INVENTION

Field of the Invention

This invention relates to a process for producing cellulose triacetate photographic film base by solution casting and more particularly to a process for producing cellulose triacetate film base at increased speed or thickness, and reduced demand for drying equipment.

The preparation of cellulose ester film and particularly triacetate film includes the steps of forming a dope solution by dissolving cellulose triacetate in a suitable solvent such as dichloromethane. The dope traditionally has a concentration of cellulose triacetate in the solvent of from about 15 to about 35 percent by weight. The dope is filtered through one or more filtration devices, and then extruded through a die as a film which is cast onto a moving surface such as a highly polished wheel or continuous band where the dope is "cured" by evaporation of the solvents from the exposed side. The dope stays on the band or wheel long enough to allow it to build sufficient strength to separate it from the band or wheel, and it is then subsequently dried through air sections and finally wound up as a roll of film.

One of the rate limiting steps in this process is the curing time necessary for the web to become strong enough to separate it from the band or wheel without delamination. If the web is removed from the band or wheel prematurely, the cohesive forces holding the web together are less than the adhesive forces holding the web to the casting surface. This will prevent the web from being separated from the casting surface properly, and will result in part or all of the web going under the die a second time, causing web brakes and other casting difficulties.

If the cohesive forces within the web can be increased while the web is on the casting surface, then the web can be separated from the casting surface sooner. This would result in a faster process if the surface curing time is held constant, or a smaller casting surface if the speed is held constant. The latter option is extremely important, since the bands and wheels used in today's cellulose triacetate film manufacturing processes are extremely large and expensive. The web must often cure on the band or wheel for 60–120 seconds. If one is inadvertently damaged, replacement costs would be considerable. It would therefore be highly desirable to reduce the necessary size of the casting surface so that replacement and implementation costs can be reduced.

As a result, there is a need for a process for producing cellulose triacetate film which utilizes decreased curing time on the casting surface without causing delamination of the web.

SUMMARY OF THE INVENTION

The invention provides a method of making a cellulose triacetate photographic film base which comprises providing a casting composition of cellulose triacetate, plasticizer, and solvent having a cellulose triacetate and plasticizer concentration of from 36% to 72% by weight, casting the coating composition at a temperature of from 40° C. to 63° C. on to a surface maintained at from −70° C. to 21° C. for a residence time from 3 to 8 seconds, in accordance with the equation Tr/Tg<1.9, where Tg and Tr are the glass transition temperature in degrees Kelvin and the temperature of the casting composition in degrees Kelvin at a point adjacent to the surface where the film base is separated from the surface.

Extensive experimentation has shown that delamination between the film base and the casting surface occurred when the Tr/Tg ratio is between 1.9 and 2.2. If the ratio is higher than 2.2, delamination occurs in all cases. If the ratio is lower than 1.9, delamination does not occur. Therefore, a ratio of Tr/Tg ratio of less than 1.9 guarantees a process where delamination on the casting surface will not occur. The Tg is determined by the Fox equation, where:

$$1/Tg = w_1/Tg_1 + w_2/Tg_2 + \sum_{i=3}^{n} w_i/Tg_n.$$

$W_i$ and $Tg_i$ are the mass fraction and the Glass transition temperature of the ith component, respectively, $w_i$ can be determined in a number of ways, including Nuclear magnetic resonance, Near infrared spectroscopy, and the like.

DESCRIPTION OF PREFERRED EMBODIMENTS

In the preparation of cellulose triacetate photographic film base in accordance with this invention, a very concentrated dope solution is first prepared by mixing and dissolving cellulose triacetate (CTA) and a plasticizer such as triphenyl phosphate, dibutyl phthalate, tricresyl phosphate, butyl stearate, tetraethylene glycol dimethyl ether, and the like, in a dichloromethane solvent to which may be added other ingredients such as alcohols including ethanol, butanol, propanol, methanol, mixtures thereof, and the like; ketones including acetone, methylethyl ketones, and the like; cyclic alkanes such as cyclohexane, methylcyclohexane, cyclopentane, and the like. The plasticizer to cellulose triacetate ratio is 13–17% by weight. This cellulose triacetate/plasticizer is mixed with solvents to a concentration greater than 36%. The solvents are comprised of dichloromethane, present in ranges from 75% to 85% by weight, methanol in ranges from 6% to 15%, either butanol or cyclohexane in ranges of from 5% to 10%, and acetone in ranges of from 0% to 3%. This dope solution is pumped under a pressure of 7 to 50 atmospheres through a heater where it is heated to a temperature of from about 40° C. to about 63° C. and then through a fine filter where particles and slugs of gelatinous material are removed. The filtered material still under the indicated pressure and within the temperature range indicated is cast onto a highly polished rotating roll or continuous belt or band surface maintained at a temperature of from −70° C. to 21° C. After 3–8 seconds the web can be removed from the surface without delamination and dried in accordance with the conventional techniques known in the art of preparing cellulose triacetate photographic film base. In a preferred method, the solids consist of 85% CTA and 15% triphenyl phosphate. It is preferred that this solid mixture be combined with a solution consisting of 78% dichloromethane, 12% methanol, and 7% cyclohexane or butanol, with the most preferred being butanol, and 3% acetone. It is preferred that the pressure of the solution as it is passing through the heat exchanger and the filtering device be maintained under a pressure preferably of from about 10 to 45 atmospheres and most preferably from about 15 to 40 atmospheres. The temperature of the dope solution prior to being cast upon the highly polished surface is preferably within the range of from 45° C. to 63° C., and most preferably at a temperature of from about 55° C. to 63° C. The solution is then cast on to a surface which is at a temperature preferably of from about −70° C. to 8° C., and most preferably at a temperature of from about 0° C. to 8° C.

The dope or casting composition is prepared in the mixer by dissolving cellulose triacetate/plasticizer in the solvent dichloromethane or mixture of dichloromethane with other ingredients. From the mixer, it is pumped through a coarse filter and then pumped through a heat exchanger wherein the pressure is maintained within the range of 7 to 50 atmospheres and the temperature of the dope is raised to 40° C. to 63° C. The dope is next filtered through a fine filter to remove any gelatinous particles or other matter. The fine filter generally has openings of approximately 30 micrometers. This general procedure follows that of U.S. application Ser. No. 08/308,011 filed Sep. 16, 1994 now U.S. Pat. No. 5,529,737 which is incorporated herein by reference.

Finally, the dope still under the pressure indicated above and within the temperature range indicated above, is cast by means of a conventional die, including coat hanger dies, horseshoe dies, and the like onto the polished roll at the temperature described above. After 3–8 seconds, the web is removed from the surface of the roll and conveyed into air or nitrogen dryers, and finally wound into a roll.

The invention is further illustrated by the following examples:

EXAMPLE 1

A solution consisting of 39.5% CTA and 6.6% triphenyl phosphate was mixed with 1.5% acetone, 6.3% methanol, 4.3% butanol, and the balance dichloromethane stirred at ambient temperature in a mixer and pumped out of the mixer through a coarse filter, the media having openings of 30 µm and then pumped at a pressure of 41 atmospheres to a heat exchanger where the temperature was raised to about 63° C. The heated solution was then pumped through a fine 30 micrometer absolute depth media filter. A film of thickness such that the final, dried web was 118 µm was extruded out of a coat hanger die onto a cooled stainless steel drum with a surface temperature of 1° C. for 7.5 seconds. The Tg and Tr were determined to be 158.8° K., and 284.9° K. giving a Tr/Tg ratio of 1.79. This web was readily removed from the casting surface without delamination.

COMPARATIVE EXAMPLE 2

Example 1 is repeated, except that the cooled drum temperature was raised to 21.1° C. The Tg and Tr are determined to be 158.8° K. and 304.9° K., respectively, giving a Tr/Tg ratio of 1.92. This web could not be cleanly removed from the casting surface, and delamination of the cellulose triacetate web resulted.

COMPARATIVE EXAMPLE 3

Example 1 was repeated except the temperature of the cooled drum is 7.2° C., and the residence time on the drum was 5.2 seconds. The Tg and Tr were determined to be 157.6° K. and 305.3° K. respectively, which yields a Tr/Tg ratio of 1.94. The web could not be cleanly removed from the casting surface, and delamination of the cellulose triacetate web resulted.

EXAMPLE 4

Example 1 was repeated except the % components of the inlet solution were changed to 49.8% CTA, 6.3% Triphenyl phosphate, 1.35% acetone, 5.7% methanol, 4.1% butanol, with the balance being dichloromethane. The Tg and Tr were determined to be 165.9° K. and 286.0° K. respectively, which yields a Tr/Tg ratio of 1.72. This web was easily separated from the cooled drum surface.

EXAMPLE 5

Example 1 is repeated, except the % components of the inlet solution were changed to 44.4% CTA, 7.0% TPP, 0% acetone, 4.7% methanol, 2.7% cyclohexane, and the balance dichloromethane was cast onto the cooling drum at 7.2° C. for 4.7 seconds. The Tg and Tr were determined to be 166.1° K. and 198.2° K. respectively, which yields a Tr/Tg ratio of 1.8. This web was easily separated from the cooled drum surface.

What is claimed is:

1. A method of making a cellulose triacetate photographic film base which comprises providing a casting composition of cellulose triacetate, plasticizer, and solvent having a cellulose triacetate and plasticizer concentration of from 36% to 72% by weight and a plasticizer to cellulose ratio of from 13 to 17 percent, casting the casting composition at a temperature of from 40° C. to 63° C. on to a surface maintained at from −70° C. to 21° C. for a residence time from 3 to 8 seconds, in accordance with the equation Tr/Tg<1.9, where Tg and Tr are the glass transition temperature in degrees Kelvin and the temperature of the casting composition in degrees Kelvin at a point wherein the film base is separated from the surface.

2. The method of claim 1 wherein the cellulose triacetate and plasticizer concentration is from 36%–60% by weight.

3. The method of claim 1 wherein the cellulose triacetate and plasticizer concentration is from 36%–45% by weight.

4. The method of claim 1 wherein the casting composition is cast at a temperature of from about 55° C. to about 63° C.

5. The method of claim 1 wherein the residence time on the casting surface is from 4.5 seconds to 7.5 seconds.

6. The method of claim 1 wherein the ratio of Tr/Tg is from about 1.7 to 1.9.

7. The method of claim 1 wherein the ratio of plasticizer to cellulose triacetate ratio of the casting composition is from 13 to 17 percent by weight.

8. The method of claim 1 wherein the solvent is a mixture of dichloromethane and a lower alkanol.

9. The method of claim 8 wherein the solvent mixture also contains a ketone or a cyclic alkane.

10. The method of claim 9 wherein the solvent mixture comprises dichloromethane and methanol.

11. The method of claim 1 wherein the plasticizer is selected from the group consisting of triphenyl phosphate, dibutyl phthalate, tricresyl phosphate, butyl stearate, and tetraethylene glycol dimethyl ether.

* * * * *